April 9, 1929.  A. J. BUSHEMI  1,708,353
ANTISKID DEVICE
Filed Nov. 29, 1927   2 Sheets-Sheet 2
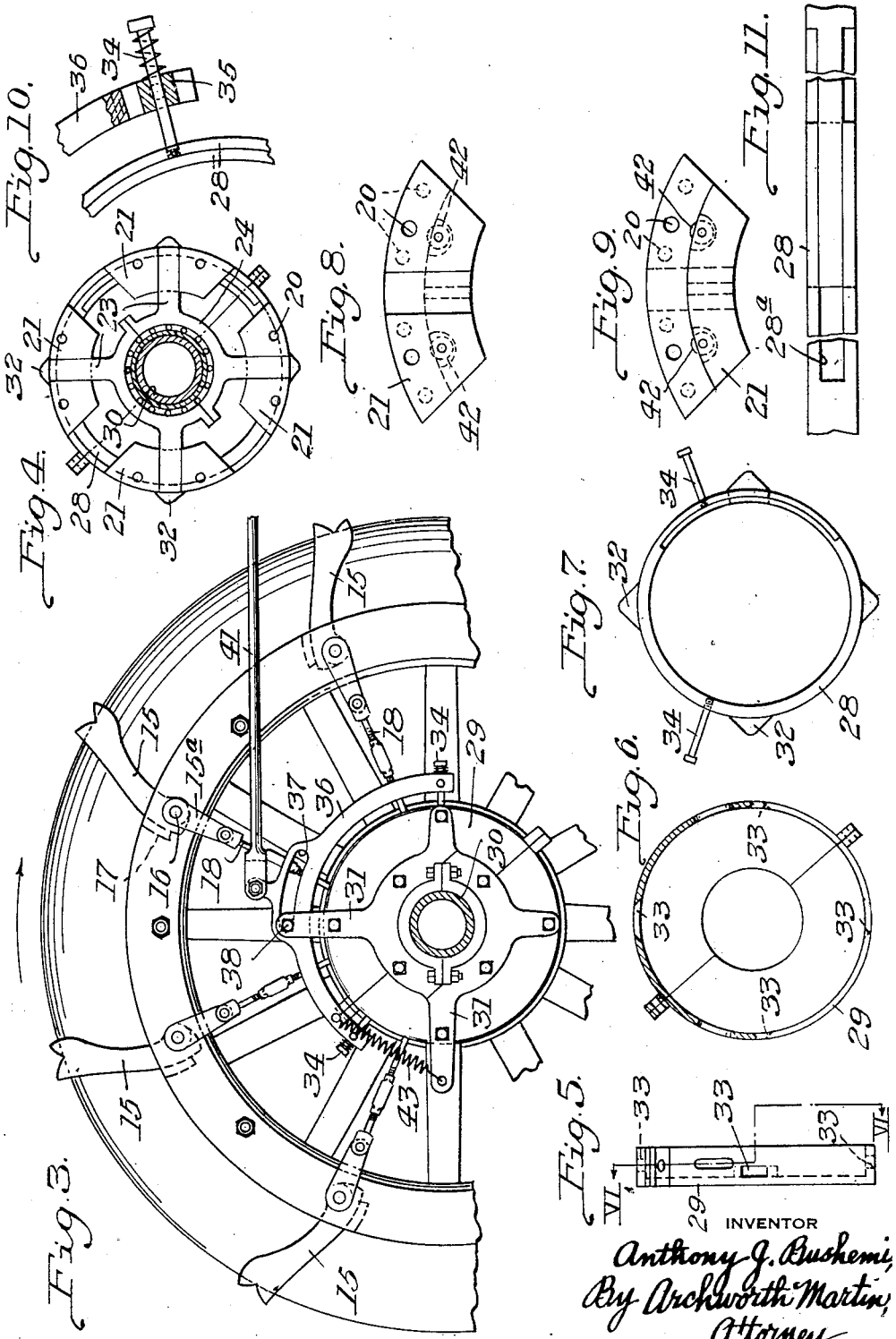
INVENTOR
Anthony J. Bushemi,
By Archworth Martin,
Attorney.

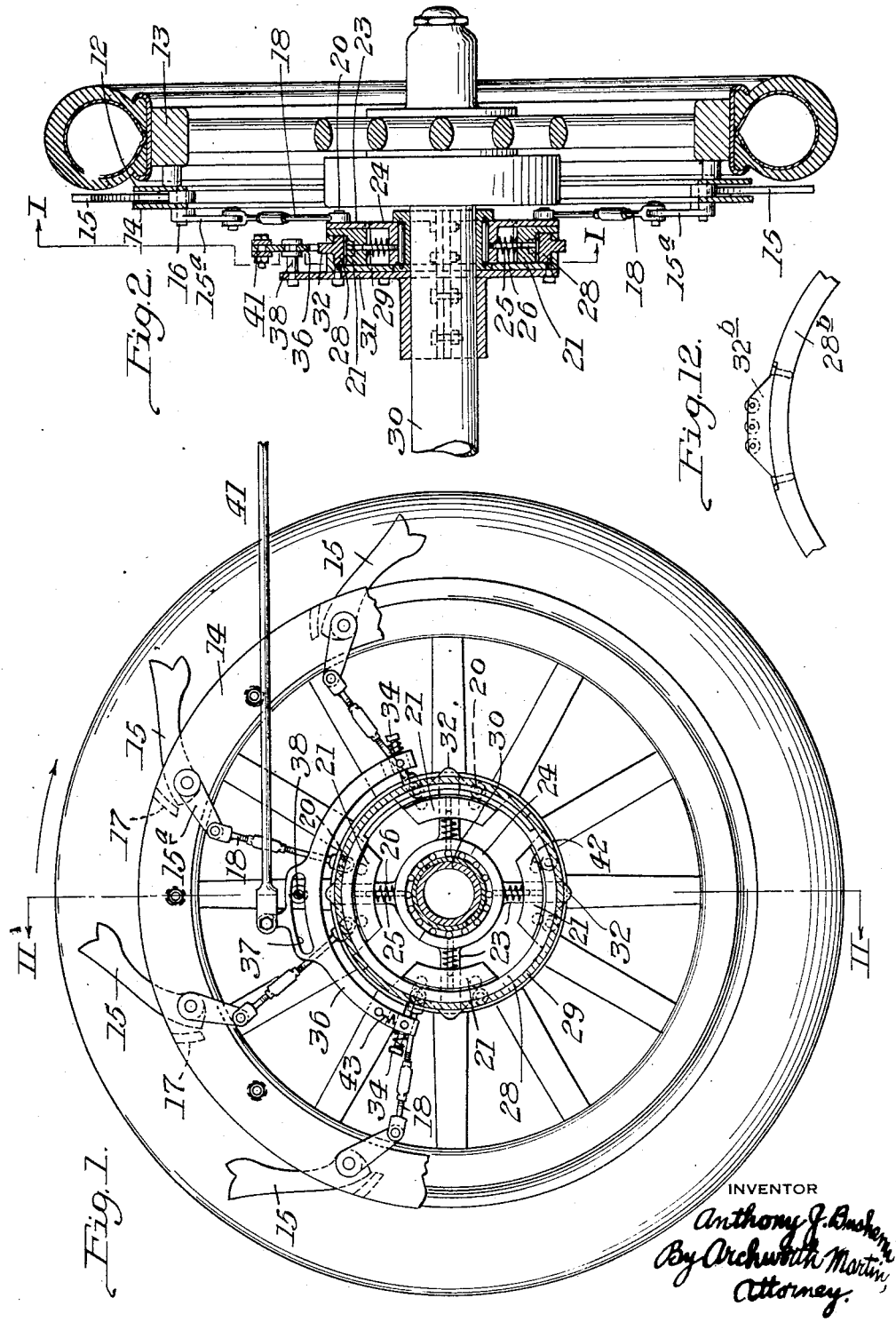

Patented Apr. 9, 1929.

1,708,353

UNITED STATES PATENT OFFICE.

ANTHONY J. BUSHEMI, OF CARNEGIE, PENNSYLVANIA.

ANTISKID DEVICE.

Application filed November 29, 1927. Serial No. 236,473.

My invention relates to anti-skid devices, and particularly to devices for use in connection with motor vehicles and the like, for preventing skidding and slippage of the wheels under tractive forces, especially on unpaved ground or roadways.

One object of my invention is to provide a non-skid device wherein the use of chains is unnecessary and one which may be readily brought into operative and inoperative positions without the necessity of stopping the vehicle and without the use of tools.

One form which my invention may take is shown in the accompanying drawing, wherein Figure 1 is a view taken on the line I—I of Figure 2 and showing a vehicle wheel equipped with my invention; Fig. 2 is a vertical sectional view of the device, taken on the line II—II of Fig. 1; Fig. 3 is a view similar to Fig. 1, but showing the vehicle wheel and associated parts in elevation; Fig. 4 is a sectional view, looking from the right hand side of Fig. 2; Fig. 5 is a view, in edge elevation, of the drum of Fig. 3; Fig. 6 is a view of the drum taken on the line VI—VI of Fig. 5; Fig. 7 is a side elevational view of the expanding ring which fits within the drum of Figs. 5 and 6; Fig. 8 is a view showing one of the finger controlling segments of Fig. 2; Fig. 9 is a view of the opposite side of the segment of Fig. 8; Fig. 10 is a view, on an enlarged scale, of a portion of the apparatus of Fig. 3; Fig. 11 is a protracted view of a portion of the ring of Fig. 7; and Fig. 12 shows a modification of the expanding ring of Fig. 7.

Only one wheel of a motor vehicle is shown, since it will be understood that the apparatus will be duplicated at the other end of the axle which carries such wheel, the wheels being preferably the rear or driving wheels.

The apparatus includes an annular plate 12 that may be bolted or otherwise suitably secured to the wheel felly 13, and a cover plate 14 that is mounted in spaced relation to the plate 12 so as to permit shoes or road-gripping fingers 15 to move in the plane between the plates 12 and 14. These fingers serve more especially as tractive devices, to prevent slipping of the wheels in soft ground. The fingers 15 are pivotally connected through shafts 16 to the plates 12 and 14, and the plates are provided with a series of shoulders or abutting surfaces 17 against which the fingers may lie, as shown more clearly in Figs. 1 and 3, so that the fingers will be braced against driving stresses when the vehicle wheel is turning in the direction indicated by the arrows.

A crank $15^a$ is connected to the pivoted shaft 16 of the fingers 15, and a link 18 is connected to the crank of each of the fingers 15 and is movable radially of the wheel to project the fingers to operative position, as shown in Fig. 3, and to retract them to inoperative position as shown in Fig. 1, in a manner to be hereinafter described.

The inner ends of the links 18 are connected, at 20, to segments 21 which are radially movable under the control of the operator as hereinafter described, to oscillate the shoes 15 to and from their operative positions. The segments 21 are provided with grooves 22 which have slidable engagement with ribs 23 that are formed upon a spider 24, guide pins 25 and springs 26 being provided by means of which the segments 21 are normally held in expanded position.

The segments 21 are contracted against the springs 26 by a compressible ring 28 that lies within a drum 29 which is open at one side. The drum 29 is shown as divided diametrally so that it can be conveniently placed upon the axle housing 30 of the vehicle. The axle housing, as is common in automobile practice, is non-rotatable. The portions of the drum 29 may be held in assembled relation and in position on the axle by brackets 31 having hub portions that partially encircle the axle housing 30 and are bolted to the drum.

The expansive ring 28 fits within the drum 29 and projections 32 that are formed on the periphery of the ring 28 normally extend through openings 33 in the peripheral wall of the drum 29. The ring 28 is provided with radially-extending studs 34 which extend through slots in the periphery of the drum 29, so that the ring may have slight rotative movement within the drum. The outer portions of the stud 34 have swivel connections at 35 with the ends of a yoke 36 which has a guide slot 37 through which a stud-like projection 38 on one of the bracket members 31 extends to serve as a guide for the yoke. The yoke has connection with a pull lever or link 41 that leads to a brake pedal or other manually operable device (not shown).

It will be seen that when the link 41 is pulled to the right, the yoke 36 and the ring 28 will be given rotative movement, such movement resulting in the projections 32 being forced, by camming action, radially inward out of their positions within the openings 33, thus compressing the ring 28, the ends of the ring sliding on one another as will be apparent from an inspection of Fig. 7.

The ring 28 encircles the segments 21 which are provided with anti-friction rollers 42 on their peripheral surfaces and draws said segments inwardly as the ring is contracted, thus moving the fingers 15 to projected position. The rollers prevent binding of the segments upon the ring, since the ring is normally stationary, while the segments 21 and the spider 23 rotate with the wheel. One end of the ring 28 is grooved at 28$^a$ (Fig. 11) and the other end is of tongue-like form, fitting in the groove, so that a substantially smooth rolling surface will be provided for the rollers.

A spring 43 is provided for returning the yoke 36 to retracted position when pulling force is removed from the link 41, thus imparting backward rotative movement to the ring 28 and withdrawing the fingers of shoes 15 to retracted or inoperative position. One end of this spring is connected to the yoke 36 and its other end is anchored to the bracket 31, upon retractive movement of the ring. The projections 32 will again be expanded into the openings 33 and the fingers 15 therefore yieldably held in inoperative position.

In Fig. 12, I show a modification of a portion of the ring 28 of the other figures, on an enlarged scale. This ring 28$^b$, is operated in substantially the same manner as the ring 28, but is provided with a detachable camming member 32$^b$ that carries antifriction rollers which will engage the wall of the drum 33 when the ring is contracted, thus reducing wear and rendering the ring more freely oscillatable.

I claim as my invention:—

1. The combination with a vehicle wheel, of tractive fingers connected thereto and having movement radially thereof, segmental members connected to the inner ends of said fingers, the fingers and said members being rotatable with the wheel, and a normally non-rotatable contractible member having interlocking engagement with said segments, to effect radial movement thereof.

2. The combination with a vehicle wheel, of radially movable road-engaging members connected to the wheel, a collapsible ring, inter-engaging means between said ring and said members which permit relative rotative movement thereof, but cause radial movement of said members upon contracting movement of the ring, a non-rotatably mounted drum, a yieldable connection between said ring and said drum permitting limited relative rotative movement thereof, and means for imparting slight rotative movements to the ring.

3. The combination with a vehicle wheel, of radially movable road-engaging members connected to the wheel, a collapsible ring, inter-engaging means between said ring and said members which permit relative rotative movement thereof, but cause radial movement of said members upon contractive movement of the ring, a non-rotatably mounted drum for receiving the ring, and co-operating cam surfaces on said ring and said drum arranged to cause contracting movement of the ring when it is given rotative movement in one direction with respect to the drum.

4. The combination with a vehicle wheel, of radially movable road-engaging members connected to the wheel, a collapsible ring, inter-engaging means between said ring and said members which permit relative rotative movement thereof, but cause radial movement of said members upon contracting movement of the ring, a non-rotatably mounted drum for receiving the ring, co-operating cam surfaces on said ring and said drum arranged to cause contracting movement of the ring when given rotative movement in one direction with respect to the drum, a yoke partially encircling the drum and connected to said ring, and means for moving said yoke circumferentially of the drum for effecting rotative movement of the ring.

5. The combination with a vehicle wheel, of radially movable road-engaging fingers, segments connected to the inner ends of said fingers, a spider serving as a guide plate for said segments during radial movements thereof, a contractible band surrounding said segments, and means for expanding and contracting said band to effect radial movements of the segments.

6. The combination with a vehicle wheel of radially-movable road-engaging members connected to the wheel, a collapsible ring, inter-engaging means between said ring and said members which permit relative rotative movement thereof, but cause radial movement of said members upon contractive movement of the ring, a non-rotatably mounted drum for receiving the ring, radially-extending projections on the periphery of the ring having anti-friction members on their outer ends, and camming surfaces on said drum co-operating with said anti-friction members to effect contractive movement of the ring upon rotative movement thereof, relative to the drum.

In testimony whereof I, the said ANTHONY J. BUSHEMI, have hereunto set my hand.

ANTHONY J. BUSHEMI.